US006259198B1

(12) United States Patent
Yanagisawa et al.

(10) Patent No.: US 6,259,198 B1
(45) Date of Patent: Jul. 10, 2001

(54) FLAT PANEL DISPLAY APPARATUS WITH AN ARRAY OF ELECTRON EMITTING DEVICES

(75) Inventors: Shuuchi Yanagisawa; Takamasa Yoshikawa; Kazuto Sakemura; Atsushi Yoshizawa; Takashi Chuman; Nobuyasu Negishi; Takashi Yamada; Shingo Iwasaki; Hiroshi Ito; Kiyohide Ogasawara, all of Tsurugashima (JP)

(73) Assignee: Pioneer Electronic Corporation, Tokyo (JP)

( * ) Notice: Subject to any disclaimer, the term of this patent is extended or adjusted under 35 U.S.C. 154(b) by 0 days.

(21) Appl. No.: 09/219,779

(22) Filed: Dec. 23, 1998

(30) Foreign Application Priority Data

| Dec. 25, 1997 | (JP) | 9-358464 |
| Dec. 25, 1997 | (JP) | 9-358465 |
| Dec. 25, 1997 | (JP) | 9-358466 |
| Dec. 25, 1997 | (JP) | 9-358467 |

(51) Int. Cl.$^7$ ..................................... H01J 1/62
(52) U.S. Cl. ..................... 313/495; 313/496; 313/310
(58) Field of Search .............................. 313/495, 496, 313/310, 497, 506, 509, 309, 336, 351, 292

(56) References Cited

U.S. PATENT DOCUMENTS 5,652,474 * 7/1997 Wilshaw et al. ................ 313/309
5,894,189 * 4/1999 Ogasawara et al. ............. 313/310

* cited by examiner

Primary Examiner—Vip Patel
Assistant Examiner—Joseph Williams
(74) Attorney, Agent, or Firm—Morgan, Lewis & Bockius LLP

(57) ABSTRACT

An electron emission device based flat panel display apparatus is composed of a pair of a back substrate and an optically transparent front substrate opposing to each other with a vacuum space interposed therebetween, and a plurality of electron emission devices, each of which includes an electron-supply layer made of metal or semiconductor, formed on ohmic electrodes formed on a surface of the back substrate proximate to the vacuum space, an insulator layer formed on the electron-supply layer, and a thin-film metal electrode formed on the insulator layer and facing the vacuum space. The front substrate includes collector electrodes formed on its surface proximate to the vacuum space, fluorescent material layers formed on the collector electrodes, and an image display array composed of a plurality of light emitting elements corresponding to the fluorescent material layers. The electron emission device based flat panel display apparatus also comprises an insulative support member formed on the back substrate and disposed between adjacent ones of the electron emission devices, and a plurality of electrodes, each of which is disposed between adjacent ones of the thin-film metal electrodes and on the insulative support member for electrically connecting the thin-film metal electrodes.

9 Claims, 10 Drawing Sheets

FLAT PANEL DISPLAY APPARATUS WITH AN ARRAY OF ELECTRON EMITTING DEVICES

BACKGROUND OF THE INVENTION

1. Field of the Invention

The present invention relates generally to an electron emission device, and more particularly to an electron emission device based flat panel display apparatus which has a plurality of electron emission devices arranged in an image display array, for example, in a matrix form.

2. Description of the Related Art

Conventionally, in field electron emission display apparatuses, a Field Emission Display (FED) is known as a planar emission display device equipped with an array of cold-cathode electron emission source which does not require cathode heating. The emission principle of, for example, an FED using Spindt-type cold cathodes of minute protrusions is as follows: Its emission principle is like a Cathode Ray Tube (CRT), although this FED has a cathode array of Spindt-type protrusions which is different from that of CRT. In the FED, electrons are drawn into a vacuum space by means of each gate electrode spaced apart from the Spindt-type cathode, and the electrons are made to impinge upon the fluorescent substance that is coated on a transparent anode, thereby causing light emission.

This FED, however, has a problem of low production yield because the manufacture of the minute Spindt-type emitter arrays as a cold cathode is complex and involves many processes.

There is also known an electron emission device with electron emission devices of metal-insulator-metal (MIM) structure as a planar electron emission source. The electron emission device with the MIM structure comprises an Al underlayer as a base electrode, an $Al_2O_3$ insulator layer with about 10 nm thickness, and an Au overlayer, as a top electrode with about 10 nm thickness which are formed in order on the substrate. In the case that this MIM device is placed under an opposing electrode in a vacuum, when a voltage is applied between the Al underlayer and the Au overlayer and, at the same time, an acceleration voltage is applied to the opposing electrode, then some of electrons emit out of the Au overlayer and reach the opposing electrode.

However, even the electron emission device with the MIM structure merely achieves an emitting current of approximately $1 \times 10^{-5}$ $A/cm^2$, and an emitting current ratio of approximately $1 \times 10^{-3}$, and is still incapable of providing a sufficient amount of emitting electrons for displaying an image. Therefore, a flat panel display apparatus employing a plurality of such devices is also still premature for practical use.

OBJECT AND SUMMARY OF THE INVENTION

The present invention has been made in view of the above circumstances, and thus an object thereof is to provide a flat panel display apparatus which employs electron emission devices having an electron emitting efficiency high enough to stably emit electrons at a low voltage applied thereto.

The present invention provides an electron emission device based flat panel display apparatus which comprises:

a pair of a back substrate and an optically transparent front substrate opposing to each other with a vacuum space interposed therebetween;

a plurality of electron emission devices, each including an electron-supply layer made of metal or semiconductor, formed on ohmic electrodes formed on a surface of the back substrate proximate to the vacuum space, an insulator layer formed on the electron-supply layer, and a thin-film metal electrode formed on the insulator layer and facing the vacuum space, wherein the front substrate includes collector electrodes formed on its surface proximate to the vacuum space, fluorescent material layers formed on the collector electrodes, and an image display array composed of a plurality of light emitting elements corresponding to the fluorescent material layers;

insulative support members formed on the back substrate and disposed between adjacent ones of the electron emission devices; and a plurality of electrodes, each disposed between adjacent ones of the thin-film metal electrodes and on the insulative support members for electrically connecting the thin-film metal electrodes.

According to the electron emission device based flat panel display apparatus having the structure mentioned above, the bus electrodes can be prevented from breaking due to a difference in level in the electron emission devices on the back substrate.

In the embodiment of the electron emission device based flat panel display apparatus, the distance from said back substrate to the surfaces of said insulative support members proximate to said vacuum space is substantially equal to the distance from said back substrate to the surface of said thin-film metal electrodes proximate to said vacuum space.

In the embodiment of the invention, the above electron emission device based flat panel display apparatus further comprises a plurality of bus electrodes, each of said bus electrodes arranged to electrically connect adjacent ones of said thin-film metal electrodes, said bus electrodes having a width between said thin-film metal electrodes larger than a width on said thin-film metal electrodes.

In another embodiment of the electron emission device based flat panel display apparatus, said back substrate includes a plurality of first insulative ribs, each of said first insulative ribs disposed between said electron emission devices, and having a height larger than the distance from said back substrate to the surface of said thin-film metal electrode proximate to said vacuum space, each of said first insulative ribs protruding into said vacuum space.

In another embodiment of the electron emission device based flat panel display apparatus, said rear ramparts are formed on said insulative support members.

In a further embodiment of the electron emission device based flat panel display apparatus, said front substrate includes a plurality of front ramparts, each of said front ramparts having a height larger than the distance from said front substrate to the surface of said fluorescent material layers proximate to said vacuum space, each of said front ramparts protruding into said vacuum space to abut to said rear ramparts.

In the embodiment of the electron emission device based flat panel display apparatus, said front ramparts extend in a direction in which said ohmic electrodes extend, and abut to said plurality of rear ramparts.

In another embodiment of the electron emission device based flat panel display apparatus, each of said rear ramparts includes an overhung portion on the top thereof protruding in a direction substantially parallel with said back substrate.

In a still further embodiment of the electron emission device based flat panel display apparatus, said ohmic electrodes and said electrodes are stripe-like electrodes, and arranged to intersect orthogonal to each other.

DETAILED DESCRIPTION OF THE PREFERRED EMBODIMENTS

An electron emission device based flat panel display apparatus according to an embodiment of the present invention will hereinafter be described with reference to the accompanying drawings.

Figure 1:
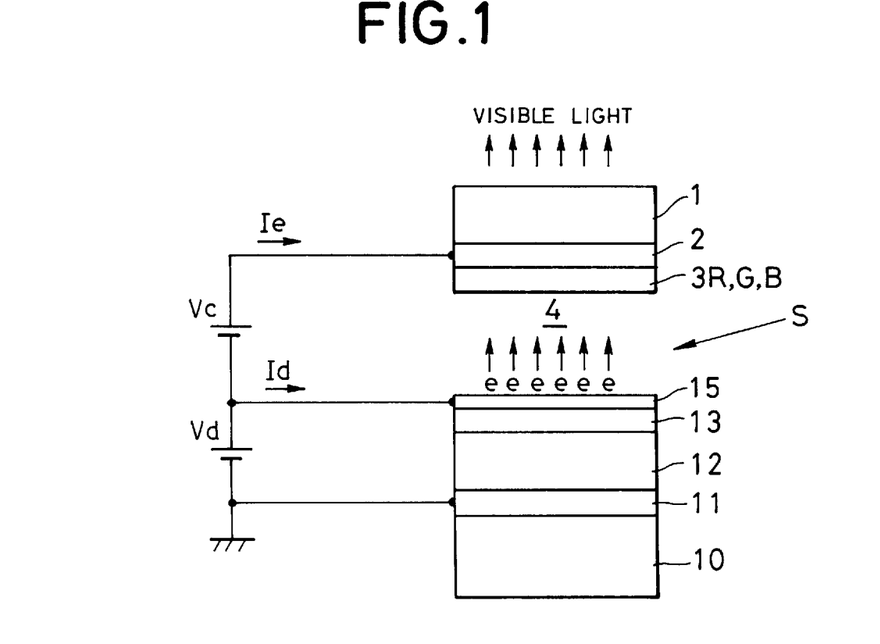
FIG. 1 is a schematic cross-sectional view of an electron emission device according to an embodiment of the present invention.

As illustrated in FIG. 1, one electron emission device S of an electron emission device based flat panel display apparatus is constructed in a stack configuration by forming an ohmic electrode 11 made of aluminum (Al), tungsten (W), titanium nitride (TiN), copper (Cu), chromium (Cr) or the like on a back substrate 10 made of a glass or the like, forming an electron-supply layer 12 made, for example, of silicon (Si) on the ohmic contact 11, forming an insulator layer 13 made, for example, of $SiO_x$ (X=0.1 to 2.0) or the like on the electron-supply layer 12, and forming a thin-film metal electrode 15 made of metal such as platinum (Pt), gold (Au) or the like, and facing a vacuum space on the insulator layer 13. The material for the back substrate 10 is not limited to glass, and ceramics such as $Al_2O_3$, $Si_3N_4$ and BN etc. may be used instead of glass. For example, on the inner surface of the back substrate 10, a metal ohmic electrode is formed in a thickness of approximately 300 nm, an electron-supply layer is formed on the metal ohmic electrode in a thickness of approximately 5 µm, and an insulator layer is formed on the electron-supply layer in a thickness of approximately 400 nm. Further, a thin-film metal electrode is formed in a thickness of approximately 10 nm on the insulator layer to complete a unit of electron emission device. A plurality of electron emission devices S are arranged on the back substrate 10 in a matrix form.

A plurality of transparent collector electrodes 2 of, for example, an indium tin oxide (so-called ITO), tin oxide (SnO), zinc oxide (ZnO) or the like, are formed on the inner surface of the front substrate 1. The collector electrodes 2 may be formed integrally. The transparent collector electrodes which trap emitted electrons are arranged in groups of three in association with red (R), green (G) and blue (B) color signals in order to provide a color display panel, and voltages are applied to those three collector electrodes respectively.

The electron emission device based flat panel display apparatus according to the invention comprises a pair of the front substrate 1 and the back substrate 10 with electron emission devices S facing each other with a vacuum space 4 interposed therebetween are supported apart from one another in parallel by a spacer and sealed.

This electron emission device can be regarded as a diode of which the thin-film metal electrode 15 at its surface is connected to a positive applied voltage Vd and the back i.e., ohmic electrode 11 is connected to a ground potential as shown in FIG. 1. When the voltage Vd e.g. 90V is applied between the ohmic electrode 11 and the thin-film metal electrode 15 to supply electrons into the electron-supply layer 12, a diode current Id flows. Since the insulator layer 13 has a high resistance, most of the applied electric field is applied to the insulator layer 13. The electrons travel in the conduction band in the insulator layer 13 toward the thin-film metal electrode 15. Some of the electrons that reach near the thin-film metal electrode 15 pass through the thin-film metal electrode 15, due to the strong electric field, to be emitted out into the vacuum space.

The electrons e (emission current Ie) discharged from the thin-film metal electrode 15 are soon accelerated by a high voltage Vc, which is applied to an opposing collector electrode (transparent electrode) 2, and is collected at the collector electrode 2. When a fluorescent substance 3 is coated on the collector electrode 2, corresponding visible light is observed.

An effective material for the electron-supply layer 12 of the electron emission device is particularly the hydrogenated amorphous silicon (a—Si:H) in which almost of the dangling bonds of a—Si are terminated by hydrogen atoms. In addition, hydrogenated amorphous silicon carbide (a—SiC:H) in which parts of Si atoms are replaced by carbon atoms (C) is also effectively used for the electron-supply layer 12. Moreover hydrogenated amorphous silicon nitride (a—SiN:H) in which parts of Si atoms are replaced by nitrogen atoms (N) may be also effectively used for the electron-supply layer 12. In addition, silicon doped with boron, aluminum, gallium, phosphorus, indium, arsenic and/or antimony may be used for the electron-supply layer 12.

The insulator layer 13 is a very thick film of dielectric having a thickness 50 nm or more. Silicon oxide $SiO_x$ (wherein subscribed x represents an atomic ratio) is effective as the dielectric material of the insulator layer 13 and, metal oxides or metal nitrides such as $LiO_x$, $LiN_x$, $NaO_x$, $KO_x$, $RbO_x$, $CsO_x$, $BeO_x$, $MgO_x$, $MgN_x$, $CaO_x$, $CaN_x$, $SrO_x$, $BaO_x$, $ScO_x$, $YO_x$, $YN_x$, $LaO_x$, $LaN_x$, $CeO_x$, $PrO_x$, $NdO_x$, $SmO_x$, $EuO_x$, $GdO_x$, $TbO_x$, $DyO_x$, $HoO_x$, $ErO_x$, $TmO_x$, $YbO_x$, $LuO_x$, $TiO_x$, $ZrO_x$, $ZrN_x$, $HfO_x$, $HfN_x$, $ThO_x$, $VO_x$, $VN_x$, $NbO_x$, $TaO_x$, $TaN_x$, $CrO_x$, $CrN_x$, $MoO_x$, $MoN_x$, $WO_x$, $WN_x$, $MnO_x$, $ReO_x$, $FeO_x$, $FeN_x$, $RuO_x$, $OsO_x$, $CoO_x$, $RhO_x$, $IrO_x$, $NiO_x$, $PdO_x$, $PtO_x$, $CuO_x$, $CuN_x$, $AgO_x$, $AuO_x$, $ZnO_x$, $CdO_x$, $HgO_x$, $BO_x$, $BN_x$, $AlO_x$, $AlN_x$, $GaO_x$, $GaN_x$, $InO_x$, $SiN_x$, $GeO_x$, $SnO_x$, $PbO_x$, $PO_x$, $PN_x$, $AsO_x$, $SbO_x$, $SeO_x$, $TeO_x$ and the like can be used as well. Furthermore, metal complex oxides such $LiAlO_2$, $Li_2SiO_3$, $Li_2TiO_3$, $Na_2Al_{22}O_{34}$, $NaFeO_2$, $Na_4SiO_4$, $K_2TiO_3$, $K_2WO_4$, $Rb_2CrO_4$, $Cs_2CrO_4$, $MgAl_2O_4$, $MgFe_2O_4$, $MgTiO_3$, $CaTIO_3$, $CaWO_4$, $CaZrO_3$, $SrFe_{12}O_{19}$, $SrTiO_3$, $SrZrO_3$, $BaAl_2O_4$, $BaFe_{12}O_{19}$, $BaTiO_3$, $Y_3Al_5O_{12}$, $Y_3Fe_5O_{12}$, $LaFeO_3$, $La_3Fe_5O_{12}$, $La_2Ti_2O_7$, $CeSnO_4$, $CeTiO_4$, $Sm_3Fe_5O_{12}$, $EuFeO_3$, $Eu_3Fe_5O_{12}$, $GdFeO_3$, $Gd_3Fe_5O_{12}$, $DyFeO_3$, $Dy_3Fe_5O_{12}$, $HoFeO_3$, $Ho_3Fe_5O_{12}$, $ErFeO_3$, $Er_3Fe_5O_{12}$, $Tm_3Fe_5O_{12}$, $LuFeO_3$, $Lu_3Fe_5O_{12}$, $NiTiO_3$, $Al_2TiO_3$, $FeTiO_3$, $BaZrO_3$, $LiZrO_3$, $MgZrO_3$, $HfTiO_4$, $NH_4VO_3$, $AgVO_3$, $LiVO_3$, $BaNb_2O_6$, $NaNbO_3$, $SrNb_2O_6$, $KTaO_3$, $NaTaO_3$, $SrTa_2O_6$, $CuCr_2O_4$, $Ag_2CrO_4$, $BaCrO_4$, $K_2MoO_4$, $Na_2MoO_4$, $NiMoO_4$, $BaWO_4$, $Na_2WO_4$, $SrWO_4$, $MnCr_2O_4$, $MnFe_2O_4$, $MnTiO_3$, $MnWO_4$, $CoFe_2O_4$, $ZnFe_2O_4$, $FeWO_4$, $CoMoO_4$, $CoTiO_3$, $CoWO_4$, $NiFe_2O_4$, $NiWO_4$, $CuFe_2O_4$, $CuMoO_4$, $CuTiO_3$, $CuWO_4$, $Ag_2MoO_4$, $Ag_2WO_4$, $ZnAl_2O_4$, $ZnMoO_4$, $ZnWO_4$, $CdSnO_3$, $CdTiO_3$, $CdMoO_4$, $CdWO_4$, $NaAlO_2$, $MgAl_2O_4$, $SrAl_2O_4$, $Gd_3Ga_5O_{12}$, $InFeO_3$, $MgIn_2O_4$, $Al_2TiO_5$, $FeTiO_3$, $MgTiO_3$, $NaSiO_3$, $CaSiO_3$, $ZrSiO_4$, $K_2GeO_3$, $Li_2GeO_3$, $Na_2GeO_3$, $Bi_2Sn_3O_9$, $MgSnO_3$, $SrSnO_3$, $PbSiO_3$, $PbMoO_4$, $PbTiO_3$, $SnO_2$—$Sb_2O_3$, $CuSeO_4$, $Na_2SeO_3$, $ZnSeO_3$, $K_2TeO_3$, $K_2TeO_4$, $Na_2TeO_3$, $Na_2TeO_4$ and the like can be used as well and still furthermore, sulfides such as FeS, $Al_2S_3$, MgS, ZnS and the like, fluorides such as LiF, $MgF_2$, $SmF_3$ and the like, chlorides such as HgCl, $FeCl_2$, $CrCl_3$ and the like, bromides such as AgBr, CuBr, $MnBr_2$ and the like, iodide such as $PbI_2$, CuI, $FeI_2$ and the like and metal oxidized nitrides such as SiAlON and the like can be used as well for the insulator layer.

Moreover, carbon such as diamond, Fullerene ($C_{2n}$) and the like or metal carbide such as $Al_4C_3$, $B_4C$, $CaC_2$, $Cr_3C_2$, $Mo_2C$, MoC, NbC, SiC, TaC, TiC, VC, $W_2C$, WC, ZrC and the like are also effective as the dielectric material of the insulator layer 13. Fullerene ($C_{2n}$) consists of carbon atoms. The representative $C_{60}$ is a spherical surface basket molecule as known a soccer ball molecule. There is also known $C_{32}$ to $C_{960}$ and the like. The subscribed x in $O_x$, $N_x$ and the like in the above chemical formulas represent atomic ratios and also herein after.

The film thickness of the insulator layer 13 may be 50 nm or greater preferably in ranging from 100 to 1000 nm.

Metals Pt, Au, W, Ru and Ir are effective as the material for the thin-film metal electrode 15 on the electron emission side. In addition, Be, C, Al, Si, Sc, Ti, V, Cr, Mn, Fe, Co, Ni, Cu, Zn, Ga, Y, Zr, Nb, Mo, Tc, Rh, Pd, Ag, Cd, In, Sn, Ta, Re, Os, Tl, Pb, La, Ce, Pr, Nd, Pm, Sm, Eu, Gd, Tb, Dy, Ho, Er, Tm, Yb, Lu and the like can be used as well for the thin-film metal electrode.

Although sputtering is particularly effective in the fabrication of those layers and the substrate, vacuum deposition, CVD (Chemical Vapor Deposition), laser ablation, MBE (Molecular Beam Epitaxy) and ion beam sputtering are also effective.

For actually implementing a flat panel display utilizing the electron emission and fluorescent light emission, the flat panel display will experience limitations 1–3 described below, so that problems associated with such limitations must be solved.

1. A front substrate must be separately painted with fluorescent materials of capable of emitting R (red), G (green), B (blue) which correspond to the three primary colors of light. In this event, while fluorescent materials of three colors R, G, B must be applied on the front substrate, the R, G, B fluorescent materials must be alternately applied along lines which extend in the same direction as that of the ohmic electrodes, when the front substrate is aligned to the back substrate, for apply the three colors in each pixel cell.

2. When an image is displayed, electron emission devices must be configured such that they correspond to a plurality of pixels arranged in a matrix form. When an image is to be displayed by a passive matrix driving scheme, an electrode thin film including metal ohmic electrodes and bus electrodes, constituting an electron emission device, must be formed in stripes on a back substrate, and moreover the respective electrodes must be oriented orthogonal to each other. An intersection of an ohmic electrode and a bus electrode functions as a pixel, the size of which is governed by the relationship between the size of a screen and a display resolution. While a pixel pitch is based on the size including the dimensions of R, G, B light emitting elements, a cell pitch is used as a basic unit.

3. When fluorescent materials for color CRT are utilized, an electron accelerating voltage must be 5 kV or higher for ensuring a certain degree of luminance produced by emitted light. In actual CRTs, an accelerating voltage of approximately 20 kV is applied. A problem arising herein is the distance between the thin-film metal electrode and a transparent collector electrode on the front substrate. After the front substrate and the back substrate have been opposed and encapsulated, the interior space defined between the two substrates is evacuated. However, if a high voltage is applied with a short distance between the substrates, a discharge phenomenon possibly occurs between the thin-film metal electrode and the transparent collector electrode, causing the electron emission device to fail. For this reason, the thin-film metal electrode and the transparent collector electrode must be spaced by a distance of 1 mm or more. With a small size screen, a spacer for forming a gap may be disposed along the periphery of a panel to keep the front substrate from the back substrate, thereby solving the problem. However, for a screen size of five inches or more, only the spacer disposed along the periphery of the panel is not sufficient to provide both the substrates with a sufficient strength, thereby causing troubles such as rupture of the substrates, and deflection of both the substrates in such a degree that they come into contact in a central portion. To solve these problems, ramparts or ribs are formed to additionally provide the effect of the spacer within the screen. Concerns about the ribs are the intervals at which they are disposed, and the size. In any case, the ribs cause a reduced aperture ratio, and it is not easy to fabricate ramparts or ribs of 1 mm high.

Figure 2:
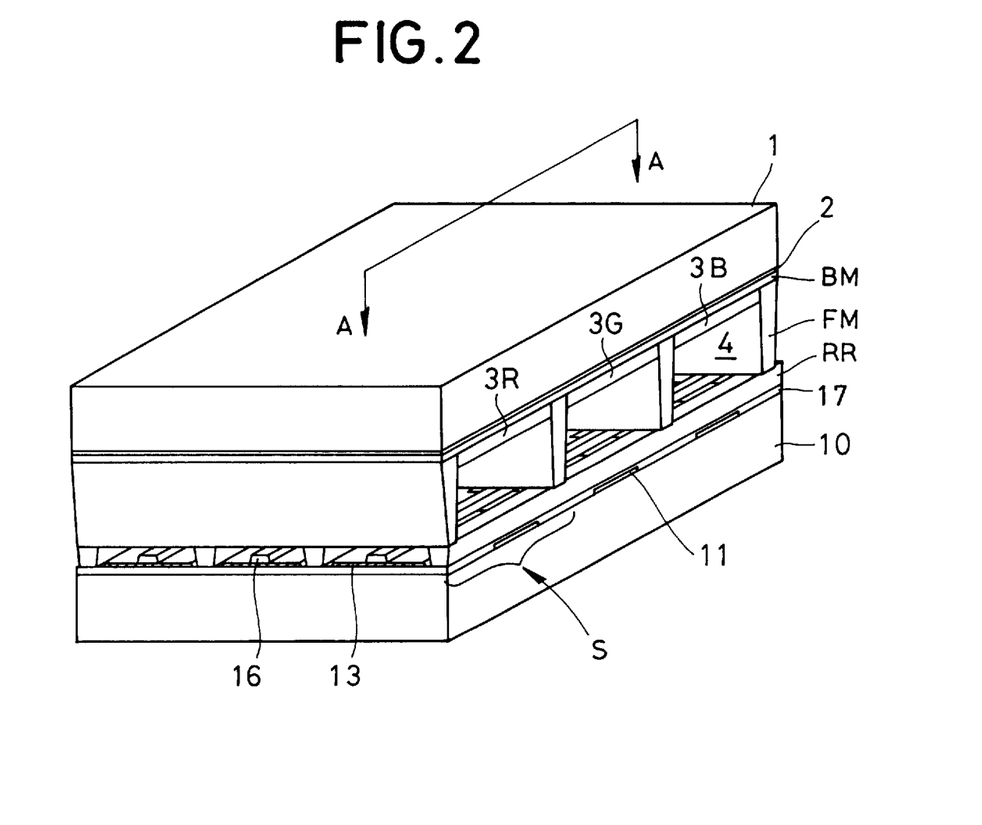
FIG. 2 is a schematic partial perspective view illustrating an electron emission device based flat panel display apparatus according to an embodiment of the present invention.

The inventors have devised an electron emission device based flat panel display apparatus which has ramparts or ribs even within the screen as mentioned. FIG. 2 illustrates an embodiment of such an electron emission device based flat panel display apparatus. The electron emission device based flat panel display apparatus of the illustrated embodiment comprises a pair of a front substrate 1 of optically transparent and a back substrate 10 made of glass or the like. Rear ramparts or ribs RRs formed on the back substrate 10 abut to front ramparts or ribs FRs formed on the front substrate 1 at the top surfaces thereof so that both the substrates are placed apart from and parallel to each other with a vacuum space 4 interposed therebetween.

The back substrate 10 is formed on the inner surface thereof proximate to the vacuum space 4 with a plurality of ohmic electrodes 11 extending in parallel with each other. The ohmic electrodes 11 are grouped into sets of three corresponding to R (red), G (green), B (blue) color signals to provide a color display panel, and are applied with predetermined signals, respectively. On the ohmic electrodes 11, a plurality of electron emission devices S are formed and arranged in a matrix form. On portions of thin-film metal electrodes of adjacent devices, a plurality of bus electrodes 16 extending perpendicular to the ohmic electrodes and in parallel with each other are routed to electrically connect the thin-film metal electrodes. An intersection of an ohmic electrode 11 and a bus electrode 16 corresponds to an electron emission device S. Therefore, a passive matrix scheme or an active matrix scheme may be applied as a driving scheme for the display apparatus of the present invention.

Figure 3:
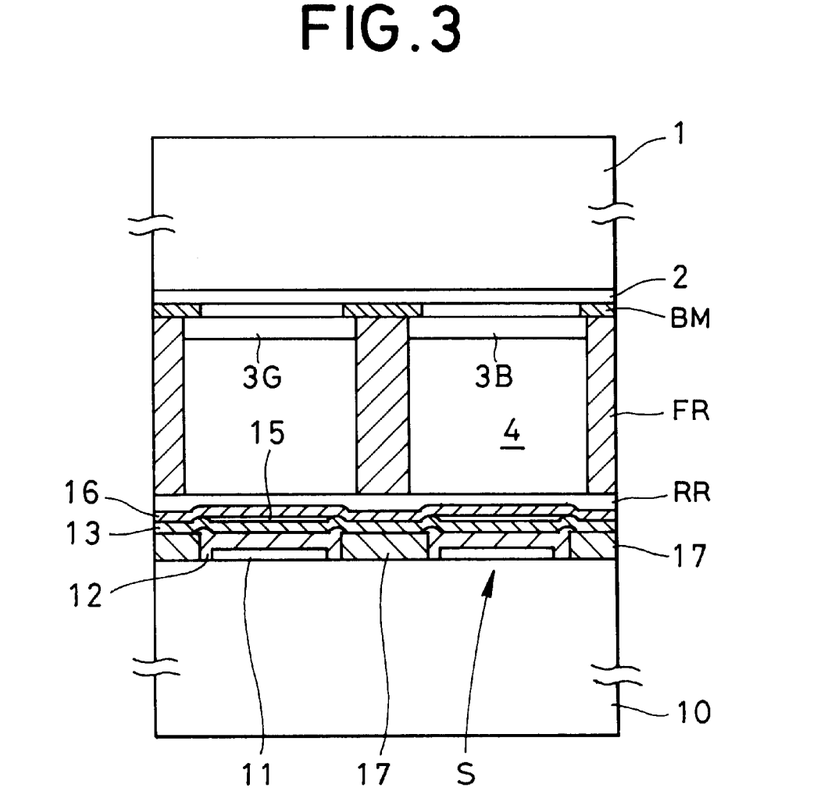
FIG. 3 is a schematic partial enlarged cross-sectional view of the electron emission device based flat panel display apparatus according to the present invention, taken along a line AA in FIG. 2.

As illustrated in FIG. 3, an electron emission device S comprises an electron-supply layer 12, an insulator layer 13 and a thin-film metal electrode 15 formed in this order on the ohmic electrode 11. The thin-film metal electrode 15 faces the vacuum space 4.

In particular, an insulative support member 17 is formed to surround each of the electron emission devices S and to define a plurality of electron emitting regions. The insulative support member 17 supports the bus electrodes 16, and prevents line failures. More specifically, as illustrated in FIG. 3, the insulative support member 17 or a material having a large electric resistance is previously formed in peripheral portions except for the electron emission devices in a thickness similar to a final thickness of the electron emission devices when formed in subsequent steps.

Figure 19:
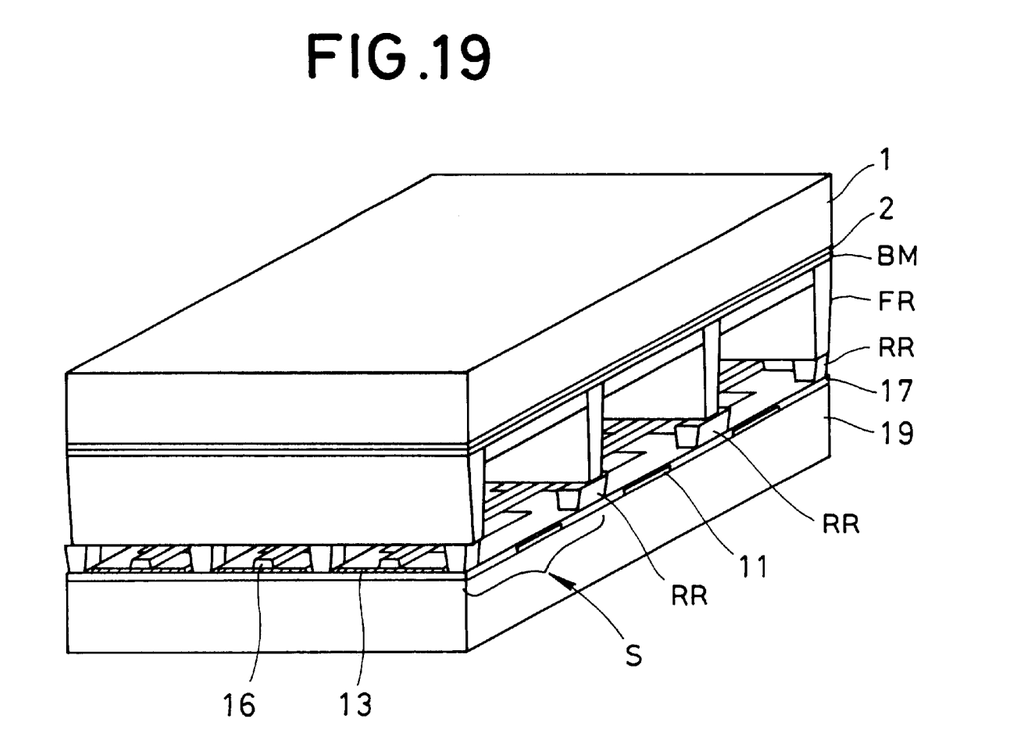
FIG. 19 is a schematic partial perspective view of an electron emission device based flat panel display apparatus according to another embodiment of the present invention.

Further, in this embodiment, the rear ribs RRs associated with the back substrate 10 is formed on the insulative support member 17 so as to protrude into the vacuum space 4 from the back substrate 10. The ribs RRs are positioned at predetermined intervals. While in FIG. 2, the ribs RRs are formed between respective electron emission devices S, the ribs RRs may be formed at larger intervals, for example, every two or three electron emission devices S. Also, while in FIG. 2, the ribs RRs are continuously formed in a direction substantially perpendicular to the ohmic electrodes 11, the ribs RRs may be intermittently formed so as to leave upper areas including portions abutting to the front ramparts FRs associated with the front substrate 1, as illustrated in FIG. 19. In this way, the direction in which the bus electrodes 16 extend can be matched with fluorescent layers 3R, 3G, 3B. In any case, the ribs RR are formed between the electron emission devices S.

Preferably, each of the ribs RRs has its top surface area larger than the bottom surface area which is in contact with the back substrate 10. In other words, each of the ribs RR is preferably formed to have an overhung portion on its top which protrudes in a direction substantially parallel with the back substrate 10.

Figure 17:
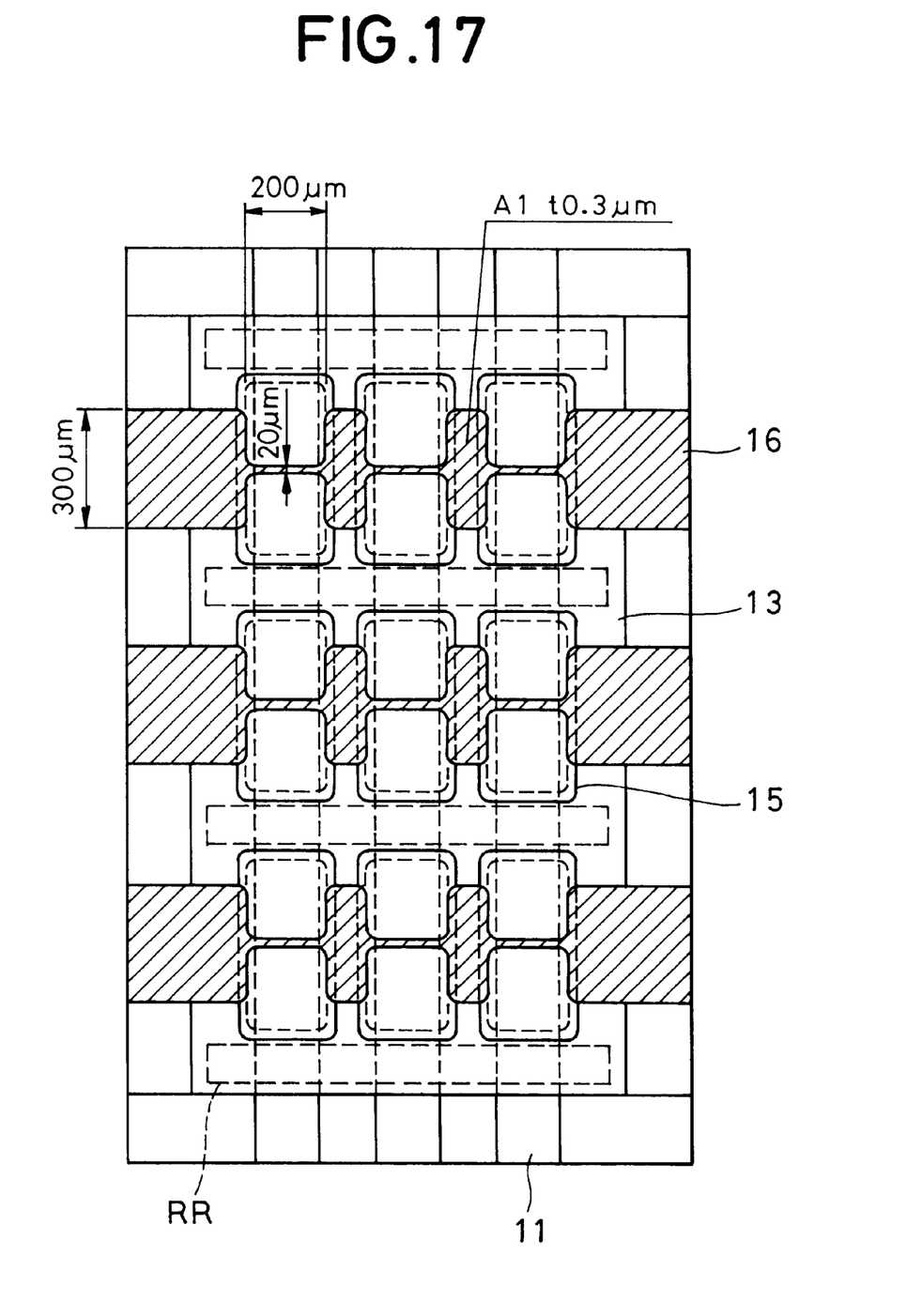
FIG. 17 is a schematic partial plan view of a substrate in a step of manufacturing the electron emission device based flat panel display according to the embodiment of the present invention.
Figure 18A:
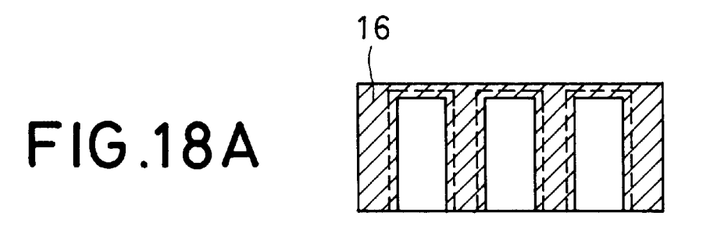
FIGS. 18A and 18B are schematic partial plan views each showing a bus electrode pattern on a substrate in a step of manufacturing an electron emission device based flat panel display apparatus according to another embodiment of the present invention.
Figure 18B:
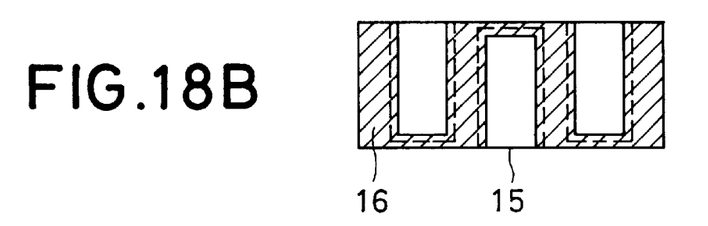

Further, while in FIG. 2, the bus electrodes 16 disposed on the thin-film metal electrodes 15 of the back substrate 10 are formed in a simple linear shape, the bus electrodes 16 are preferably formed, instead of the linear shape, so as to have a width of 300 $\mu$m, by way of example, between the thin-film metal electrodes 15 of the electron emission devices larger than the width of 20 $\mu$m, by way of example, on the thin-film metal electrodes, as illustrated in FIG. 17. In other words, the bus electrodes 16 are preferably formed to be wider between the electron emission devices than on the devices. In this way, the resistance of the bus electrodes can be reduced. Further, as illustrated in FIGS. 18A and 18B, the bus electrodes 16 may be formed such that they are conformal to the edges of the thin-film metal electrodes 15 by increasing the width between the thin-film metal electrodes 15 of the electron emission devices S and reducing the width on the thin-film metal electrodes (FIG. 18A), or such that they meander along the edges of the thin-film metal electrodes (FIG. 18B).

The material for the ohmic electrodes 11 is Au, Pt, Al, W or the like which is generally used for the wires of an IC, and also a three-layered structure of chromium, nickel and chromium films, an Al and Nd alloy, an Al and Mo alloy, and, an Ti and N alloy may be used for the ohmic electrode. The uniform thickness of for the ohmic electrode is set for supplying substantially the same current to the individual emission devices. In addition, an auxiliary insulator layer comprised of an insulator such as $SiO_2$, $SiN_x$, $Al_2O_3$ or AlN may be provided between the back substrate 10 and the ohmic electrode 11, but not shown in FIG. 2. The auxiliary insulator layer serves to prevent an adverse influence of the back substrate 10 on the device (such as elution of an impurity such as an alkaline component or a roughened substrate surface).

From the principle of electron emission, it is better that the material for the thin-film metal electrode 15 has a lower work function $\phi$ and is thinner. To increase the electron emission efficiency, the material for the thin-film metal electrode 15 should be a metal of the group I or group II in the periodic table; for example, Cs, Rb, Li, Sr, Mg, Ba, Ca and the like are effective and alloys of those elements may be used as well. To make the thin-film metal electrode 15 very thin, the material for the thin-film metal electrode 15 should be chemically stable with a high conductivity; for example, single substances of Au, Pt, Lu, Ag, Cu and Ir or an alloy thereof or a multi-layer thereof are desirable. It is effective to coat or dope a metal with a low work function as described above on or in those metals.

The material for the bus electrodes 16 can be Au, Pt, Al or the like which is generally used for the wiring of an integrated circuit IC, and should have a thickness enough to supply substantially the same potential to the individual devices, adequately of 0.1 to 50 $\mu$m. If the electrical resistance of material of the thin-film metal electrode is allowable for the bus electrodes, such electrode material may be used for the bus electrodes.

On the other hand, transparent collector electrodes 2 made of ITO to which a high voltage is applied are integrally formed on the inner surface (surface opposing to the back substrate 10) of the optically transparent front substrate 1 made of transparent glass and serving as a display surface. In case that a black stripe mask or back metal layer is provided on the front substrate 1, such a conductive layer may be serve as a collector electrode instead of the ITO transparent collector electrode.

On the collector electrodes 2, a plurality of front ribs (second insulative rib) FRs are formed in parallel with the ohmic electrodes 11. On the collector electrodes 2 between the extending front ribs, fluorescent material layers 3R, 3G, 3B made of fluorescent materials corresponding to R, G, B are formed, respectively, in opposition to the vacuum space 4. In this way, the front ribs (second insulative rib) FRs are provided at boundaries of the respective fluorescent materials to maintain a constant distance (for example, 1 mm) between the back substrate and the front substrate. Since the front ribs (second insulative rib) FRs are disposed on the front substrate 1 in a direction orthogonal to the rear ribs (first insulative rib) RRs disposed on the back substrate 10, it is ensured that the front substrate are definitely colored by the fluorescent materials in R, G, B corresponding to the three primary colors of light.

As described above, the electron emission device based flat panel display apparatus according to this embodiment has an image display array composed of a plurality of light emitting pixels which are arranged in a matrix form and each of which includes red (R), green (G) and blue (B) light emitting elements. Of course, a monochrome display panel may be formed by replacing all the RGB light emitting elements with monochrome light emitting elements.

Next, description will be made on a process of manufacturing the electron emission device based flat panel display apparatus.

<Fabrication of Back Substrate>

Figure 4:
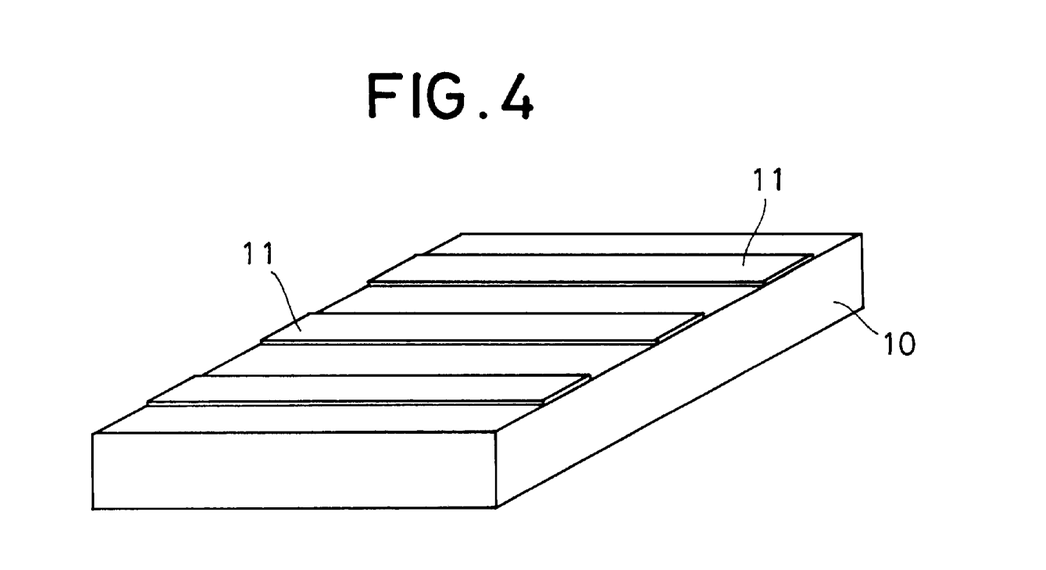
FIGS. 4 to 6, FIG. 10, and FIGS. 12 to 16 are schematic partial perspective views of a substrate in various steps of manufacturing the electron emission device based flat panel display apparatus according to the embodiment of the present invention.

As illustrated in FIG. 4, a plurality of ohmic electrodes 11 are formed on an insulating substrate such as glass or the like in stripes parallel with each other by a patterning step. Any material may be used for the ohmic electrodes as long as it has a small electric resistance and can be formed as a film. Among others, aluminum, tungsten, Cr, Cu and a multi-layer of Cu are particularly preferred. As an example, each of the stripes has a width of 160 μm, a thickness of 0.3 μm and a line interval of 300 μm.

The stripe-like ohmic electrodes 11 may be formed, for example, by a method of forming films only on areas of the ohmic electrodes using an appropriate mask, or by a method of forming an electrode film over the entire surface of the substrate and then maintaining the areas of the ohmic electrodes by a variety of etching techniques. Alternatively, a screen printing method or a photo-sensitive paste method may also be employed.

Figure 5:
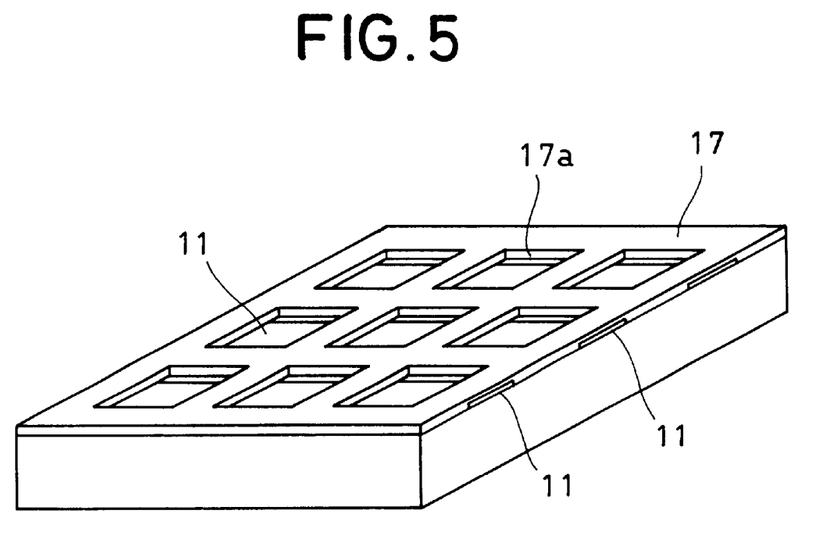

In an insulative support member fabricating step, as illustrated in FIG. 5, an insulative support member 17 made of an electrically insulating material is formed on the fabricated ohmic electrode surface. Portions of the insulative support member 17 are removed to have openings 17a in which electron emission devices are fabricated in subsequent steps. A material suitable for the insulative support member 17 is, for example, polyimide. The openings 17a expose the ohmic electrodes 11. The insulative support member 17 is formed to finally have a thickness substantially equal to the thickness of the electron emission devices, for example, 5 μm in this embodiment.

Each of the openings 17a, in which an electron emission device is subsequently fabricated, has a width of 200 μm which is larger than that of the electron emission device and a longitudinal length of 440 μm. The width of the opening is determined in consideration of possible misalignment when a mask is placed on the substrate. Specifically, attention is paid to prevent the ohmic electrodes 11 from directly coming into contact with SiOx (X=0.1 to 2.0) which is formed in a subsequent step.

Steps subsequent to the insulative support member fabricating step involve formation of a silicon film in a thickness of 5 μm as a material for an electron-supply layer for each electron emission device, and finally formation of a thin-film metal electrodes electrically continuous in a direction orthogonal to the extending direction of the metal ohmic electrodes, or formation of bus electrodes to electrically connect insular thin-film metal electrodes. If the insulative support member 17 were not provided except for the areas left for the electron emission devices in the insulative support member fabricating step, a difference in thickness of 5-μm silicon layer serving as the electron-supply layer would cause breakage of the topmost continuous thin-film metal electrodes or the bus electrodes with a much higher probability. Even with a line failure at one location, an entire line associated with the failure would become defective in a display panel. The insulative support member 17 does eliminate this structural defect.

The insulative support member 17 may be formed, for example, by using a screen printing method.

It should be noted that the formation of the insulative support member 17 is included in this step because subsequent steps are free from the influence of heat required to form the insulative support member 17. Unwanted influence of heat on the devices is eliminated by performing a step requiring a thermal treatment prior to the fabrication of the devices.

Figure 6:
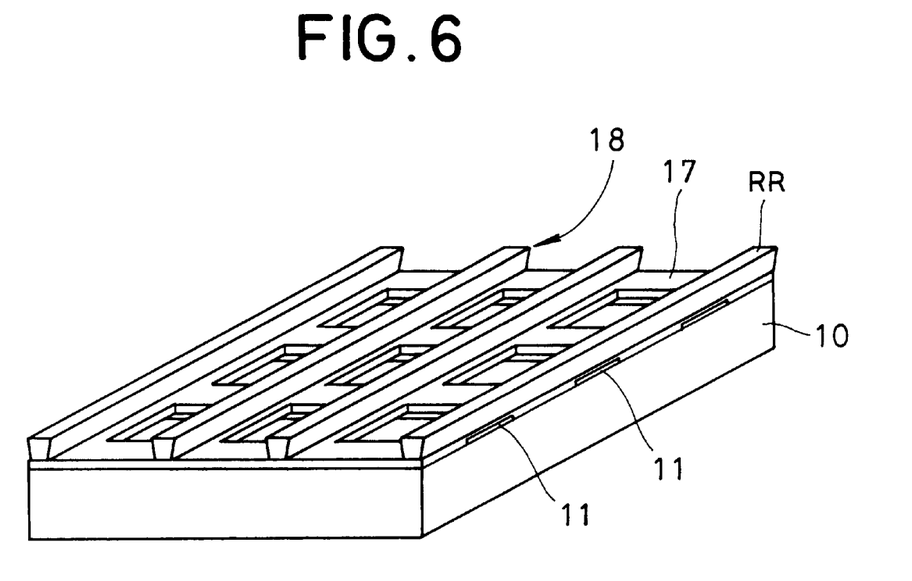

Next, in a rib forming step, as illustrated in FIG. 6, a plurality of electrically insulating rear ribs RRs, protruding from the back substrate 10, are formed over the insulative support member 17 so as to be orthogonal to the direction in which the ohmic electrodes 11 extend. In other words, at least portions of the ohmic electrodes 11 are exposed between the rear ribs RRs. In the direction orthogonal to the metal ohmic electrodes 11, each of the rear ribs RRs formed on the insulative support member 17 between electron emission devices has a width of 100 μm and a height (thickness) of 10 μm, by way of example. The rear ribs RRs may also be formed, for example, by using a screen printing method.

As effects provided by the rear ribs RRs, the following can be achieved.

It is impossible to fabricate the back substrate with ribs continuously extending in the same direction as the ohmic electrodes 11 due to possible breakage of the thin-film metal electrodes. If the back substrate was aligned to the front substrate only with the front ribs FRs interposed therebetween, the front ribs RFs of 1mm high would come in direct contact with the thin-film metal electrodes to cause breakage of the thin-film metal electrodes on the back substrate with very high probability, although no problem would arise in view of the arrangement. However, with the provision of the insulating rear ribs RRs orthogonal to the ohmic electrodes 11, the bus electrodes could not be broken since the front ribs FRs on the front substrate abut to the rear ribs RRs on the back substrate. In addition, since the ribs are fabricated on both the back substrate and the front substrate, the respective ribs require lower heights, thereby producing effects of facilitating the fabrication as well as increasing the structural strength after the substrates are aligned. Furthermore, in subsequent steps equivalent to those of manufacturing a CRT for evacuating the internal space after the alignment to form the vacuum space 4 and then encapsulating the substrates, the entire space is continuous by virtue of the orthogonally arranged front ribs FRs and rear ribs RRs, so that the evacuation can be effectively facilitated.

While the rear ribs RRs may be rectangular in cross section, the rear ribs RRs preferably have a trapezoidal cross-section in the electrode direction such that the length of an area (bottom surface) contacting with the insulative support member 17 in the electrode direction is shorter than that of the top surface. In other words, overhung portions 18 protruding in a direction parallel with the substrate are formed on the top of the rear ribs RRs in the direction in which the rear ribs RRs extend. Other than screen printing, the overhung portions 18 may be formed as undercuts of the rear ribs RRs using other appropriate techniques such as a photolithographic method or the like.

Photo-insensitive polyimide, an example of a material for the ribs, is formed on the ohmic electrodes 11 on the back substrate in a predetermined thickness, for example, by a spin coating method, and a photo resist mask made of a photo resist material is formed on the polyimide film which is then etched into the pattern of the rear ribs RRs using an appropriate technique such as reactive ion etching or the like. By etching the polyimide film with an alkaline solution serving as an etchant, the resulting rear ribs RRs are undercut.

It should be noted that polyimide so far referred to in this specification includes precursor materials before they are imidized, and true polyimide is fabricated by curing such material in a post bake at temperatures of approximately 300° C. However, any suitable materials may be used in place of polyimide as long as they are insulating materials which do not etch the underlying support material. It is therefore possible to employ an electrically insulating material which can maintain the strength before the formation of a material film which subsequently serves as the electron-supply layers.

Figure 7:
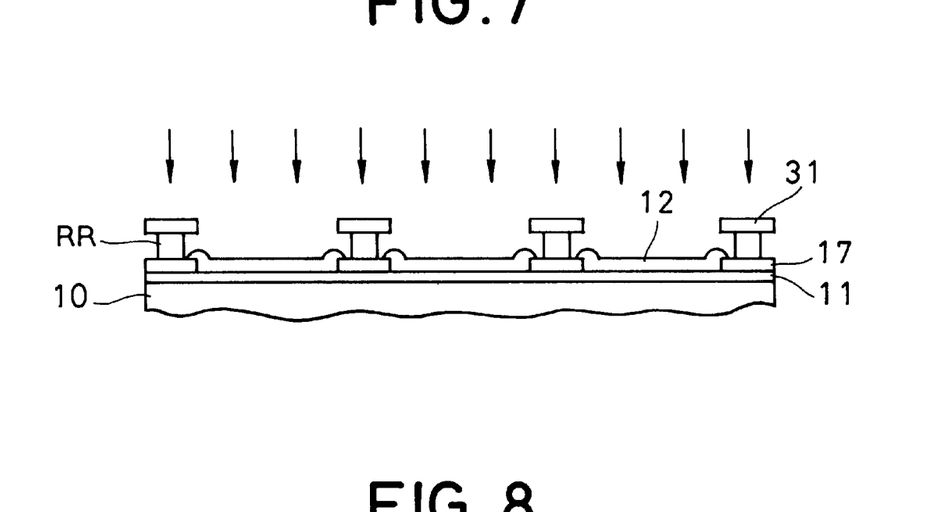
FIGS. 7 to 9, and FIG. 11 are schematic partially enlarged cross-sectional views of ramparts or ribs in the electron emission device based flat panel display apparatus according to the embodiment of the present invention.

Subsequently, as illustrated in FIG. 7, in an electron-supply layer forming step, silicon is deposited as a material for the electron-supply layers on each of exposed portion of the ohmic electrodes 11 through a mask 31 to form at least one electron-supply layer 12. As mentioned above, the insulative support member 17 is formed with openings in which electron emission devices are fabricated. The mask 31 also has similar openings. Thus, a silicon film is formed in each of the openings of the insulative support member 17 to have a width of 240 $\mu$m, a longitudinal length of 480 $\mu$m, and a thickness of 5 $\mu$m. The height of the silicon layer 12 substantially matches the height of the insulative support member 17, so that no difference in level is created. While slight eminences are observed at boundaries, the mask 31 placed on the rear ribs RRs of 10 $\mu$m high causes the silicon to diffuse, resulting in smooth curves rather than definite steps. The silicon layer 12 may be formed by any one of the vapor deposition, the sputtering method or the CVD method.

Figure 8:
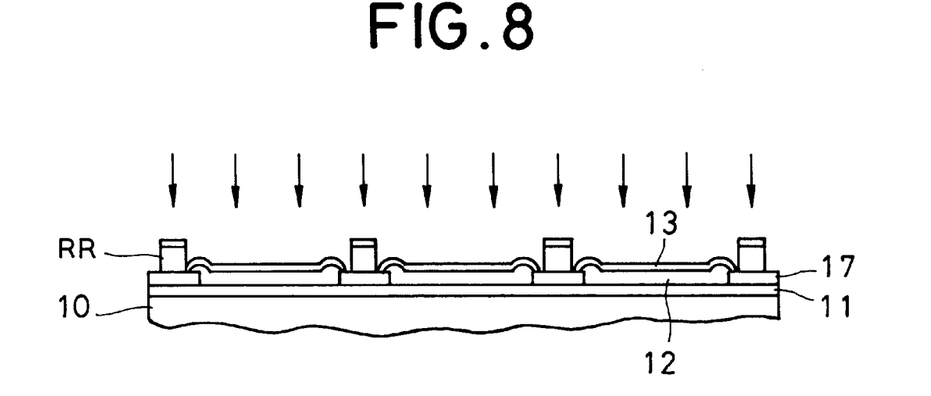

Subsequently, in an insulator layer forming step, an insulator layer 13 made of SiOx (X=0.1 to 2.0) is formed over the entire surface of the silicon layer 12 in a thickness of approximately 0.4 $\mu$m by any one of the vapor deposition, the sputtering method or the CVD method or the like, as illustrated in FIG. 8. Since SiOx has insulating properties, it may be uniformly formed over the entire surface of the silicon layer 12 without causing any problem. On the contrary, the SiOx also serves to electrically isolate the respective electron emission devices from each other. In addition, the silicon layer 12 also has an effect of mitigating differences in level created due to the formation of various material films. This results in an effect of eliminating breakage of the thin-film metal electrodes finally formed on the surface and the bus electrodes formed thereon due to difference in level.

Figure 9:
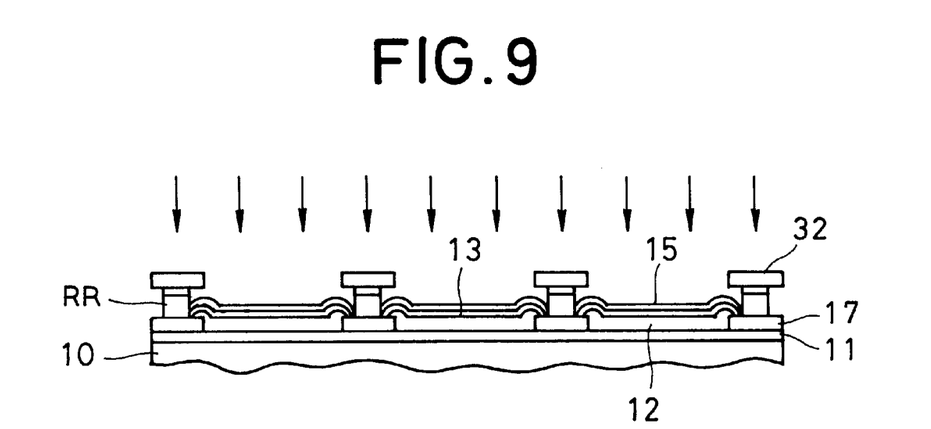
Figure 10:
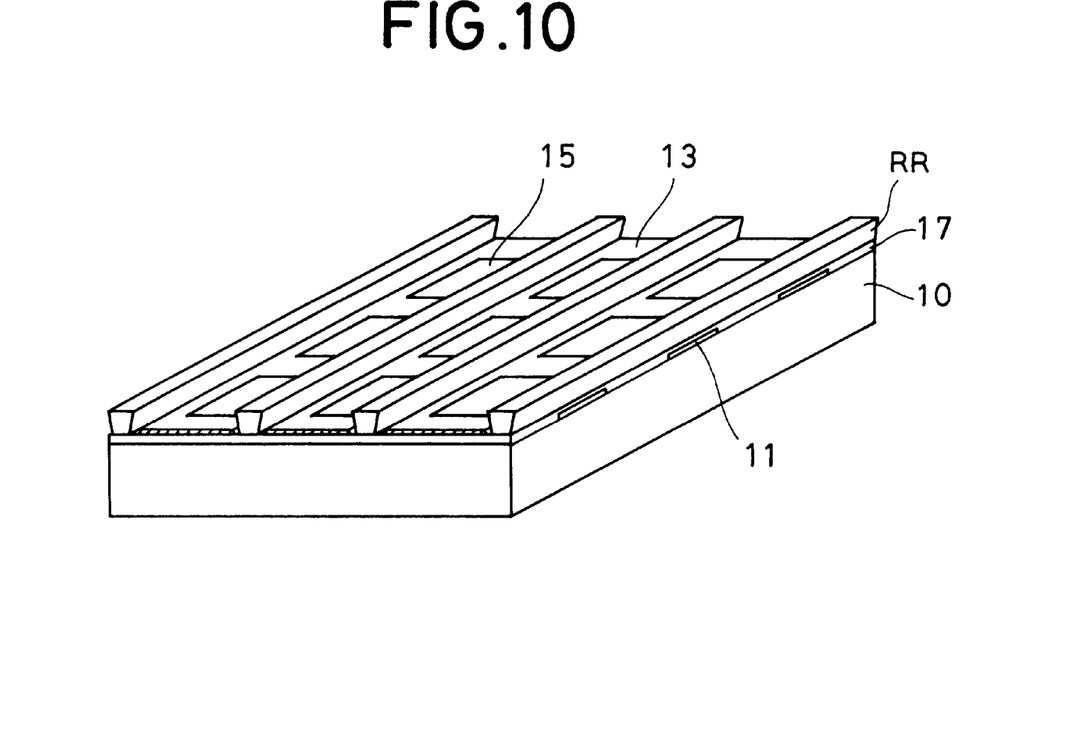

Next, as illustrated in FIG. 9, thin-film metal electrodes 15 are formed on the insulator layer 13 separately for individual electron emission devices. The thin-film metal electrodes 15 may be continuously formed instead of separately formed for individual electron emission devices, provided that they are oriented in a direction orthogonal to the ohmic electrodes. However, since the actual formation of the thin-film metal electrodes often involves vapor deposition or sputtering, the continuous electrodes would require a mask machined in continuous stripes as mentioned above. Such a mask having a large number of slits in stripes is difficult to handle in view of its strength reduced by the slits. To avoid this inconvenience, the thin-film metal electrodes 15 are formed separately for individual electron emission devices using a mask 32 in a manner similar to the formation of the silicon electron-supply layer 12. Consequently, as illustrated in FIG. 10, the thin-film metal electrodes 15 are formed as individual insular electrodes which should be linked by bus electrodes. The mask 32 having openings corresponding to respective electron emission devices more reliably ensure its strength than a mask having a large number of slits in stripes. In the alternative, if thin-film metal electrodes can be formed in continuous stripes, or if thin-film metal electrodes can be formed in stripes by other suitable forming methods such as etching and so on, it is not necessary to particularly insist on the formation of separate thin-film metal electrodes for individual electron emission devices using a mask.

A suitable material for the thin-film metal electrodes may be any one having a low work function, and platinum or gold is particularly preferred. Also, the thin-film metal electrodes are formed in a thickness of approximately 10 nm, and preferably formed by vapor deposition or sputtering. Alternatively, an etching method may also be employed as mentioned above.

Figure 11:
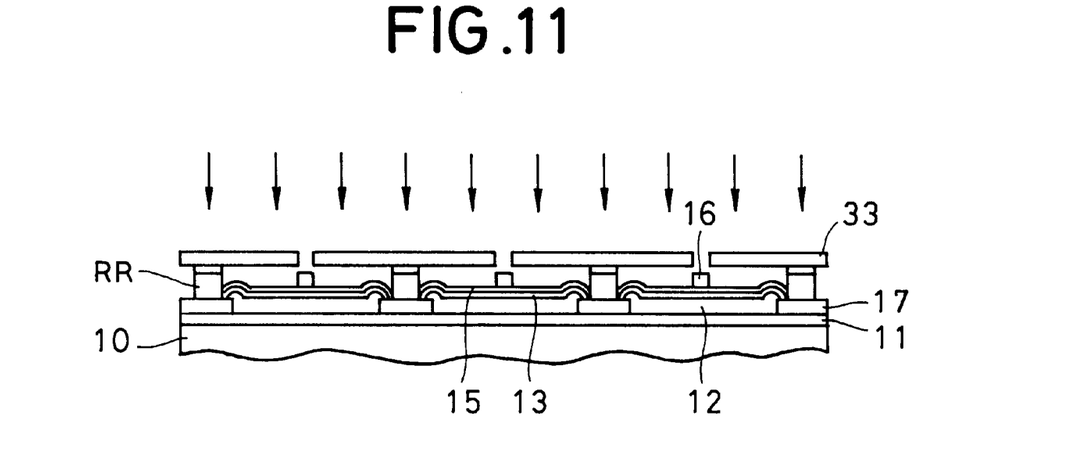

In the next bus electrode forming step, as illustrated in FIG. 11, bus electrodes 16 are formed on portions of the thin-film metal electrodes 15 using a mask 33 by a vapor deposition method, a sputtering method or the like. The bus electrodes 16 are provided for ensuring conduction between the thin-film metal electrodes. While a suitable material for the bus electrodes 16 may be any one having a low electric resistance, a metal having a low resistivity such as Al, Cu, Au or the like is of course desirable.

Figure 12:
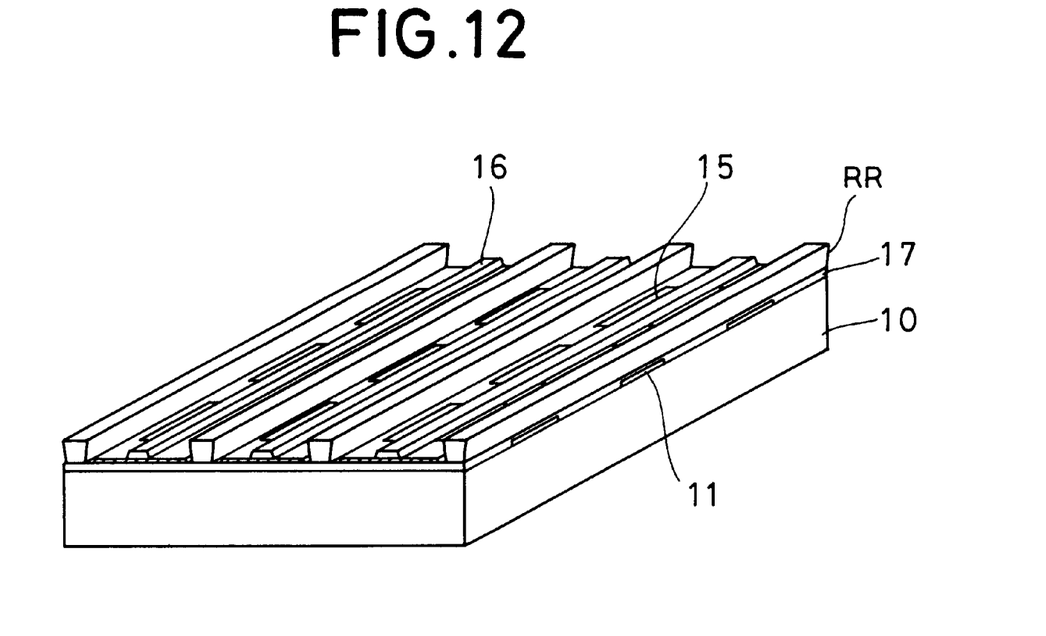

Since the bus electrodes 16 provide conducting paths in a direction orthogonal to the ohmic electrodes 11, they may be linearly routed in that direction, as illustrated in FIG. 12. However, in order to ensure the conduction and reduce the resistance, the bus electrodes 16 are made narrower on the thin-film metal electrodes 15 and wider between the thin-film metal electrodes 15 to ensure a higher aperture ratio on the thin-film metal electrodes 15. For example, as illustrated in FIG. 17, the bus electrodes 16 may have a width of 300 $\mu$m between the thin-film metal electrodes 15 of the electron emission devices and a width of 20 $\mu$m on the thin-film metal electrodes 15.

When a second insulator layer (not shown) is formed in lattice on the bus electrodes 16 and the insulator layer 13 except for exposed surfaces of the thin-film metal electrodes 15, the bus electrodes 16 are covered by the second insulator layer so that unwanted short-circuiting can be prevented.

<Fabrication of Front Substrate>

Figure 13:
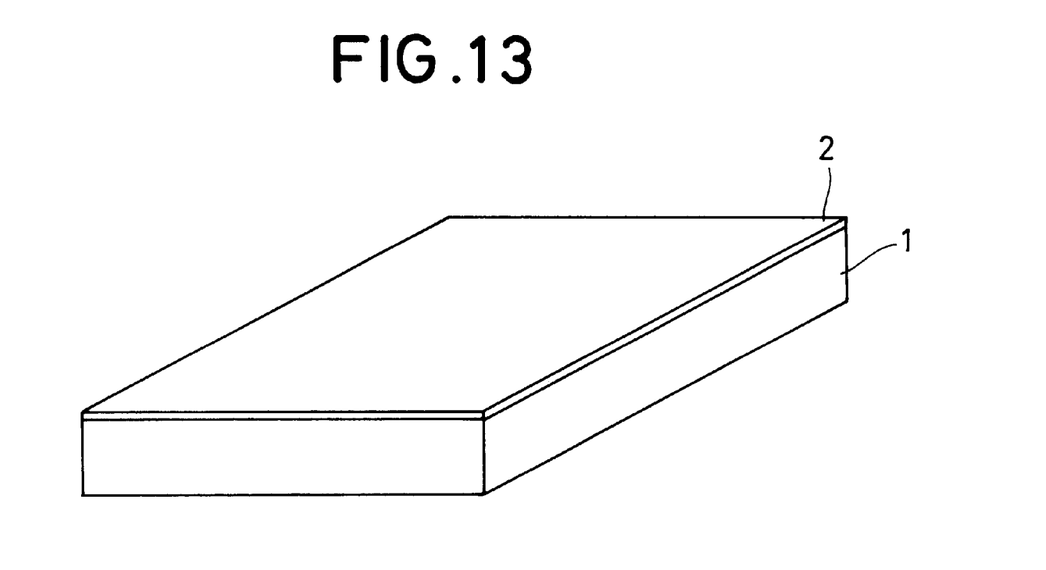

First, as illustrated in FIG. 13, a transparent collector electrode 2 is formed over an optically transparent substrate 1 made of glass or the like. The transparent collector electrode 2 preferably has a high transparency for visible light and a low electric resistance, and ITO is particularly suitable for the transparent collector electrode 2. The transparent collector electrode 2 is formed over the entire surface of the front substrate in a thickness of 0.4 $\mu$m.

Figure 14:
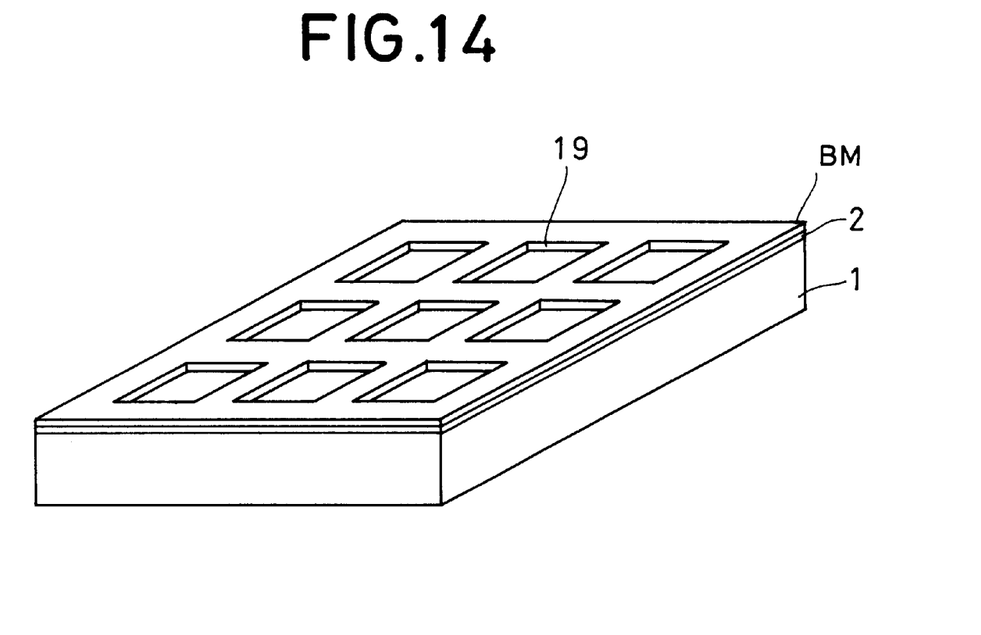

Next, as illustrated in FIG. 14, a black matrix BM are formed on the transparent collector electrode 2. The black matrix BM includes openings 19 in areas corresponding to electron emission devices on the back substrate when the front substrate is aligned with the back substrate, and a light absorbent material is formed in lattice on portions other than the openings 19. For example, the black matrix BM may have vertical and horizontal widths of 100 $\mu$m, respectively, and a thickness of 1 $\mu$m, and may be formed of CdTe by screen printing.

Figure 15:
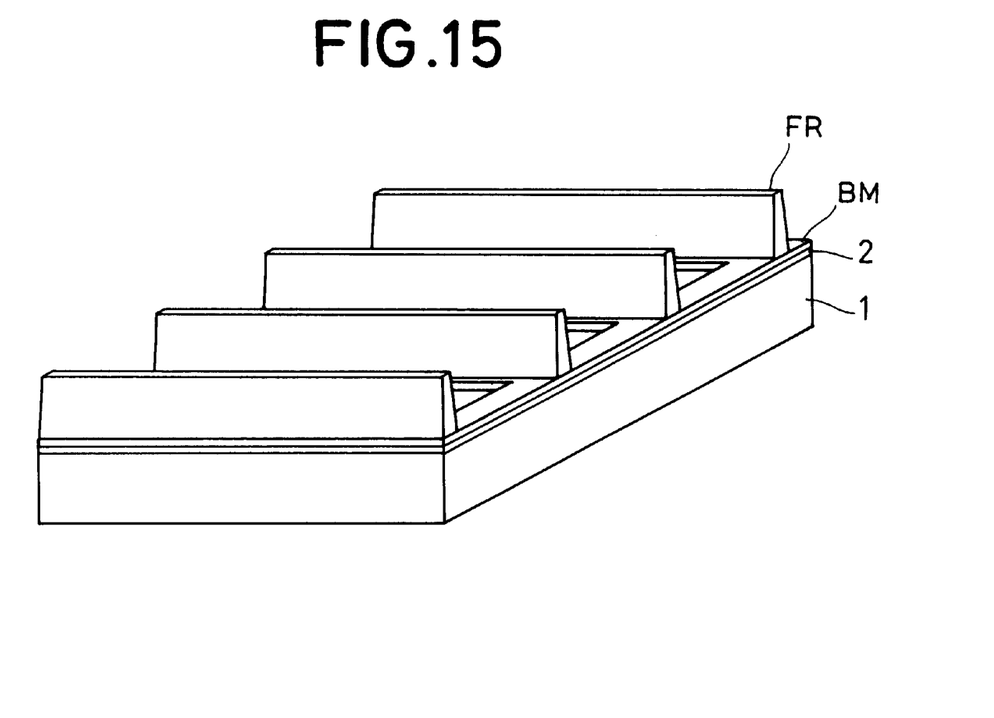

Next, as illustrated in FIG. 15, front ribs (second insulative rib) FRs are formed on the front substrate 1 so as to be parallel with the ohmic electrodes when the front substrate is aligned with the back substrate. The front ribs RFs may have a width of approximately 100 $\mu$m and a height of 1 mm. An insulating material is used for the front ribs FRs. Specifically, the front ribs FRs may be formed by a sand blast method which uniformly forms an insulating material over the black matrix BM in a thickness of 1 mm and blasts fine solid particles onto the insulating material, or by any suitable method such as screen printing which can provide thick films. This front ramparts ensure a spacing between the substrates to prevent short-circuiting between the collector electrodes and the bus electrodes, and allows vacuum spaces of a plurality of electron emission devices to communicate with each other. The front ribs (second insulative rib) FRs have an effect of creating a distance between the back substrate and the front substrate and an effect of serving as separator ribs when fluorescent materials are applied in a subsequent step.

Figure 16:
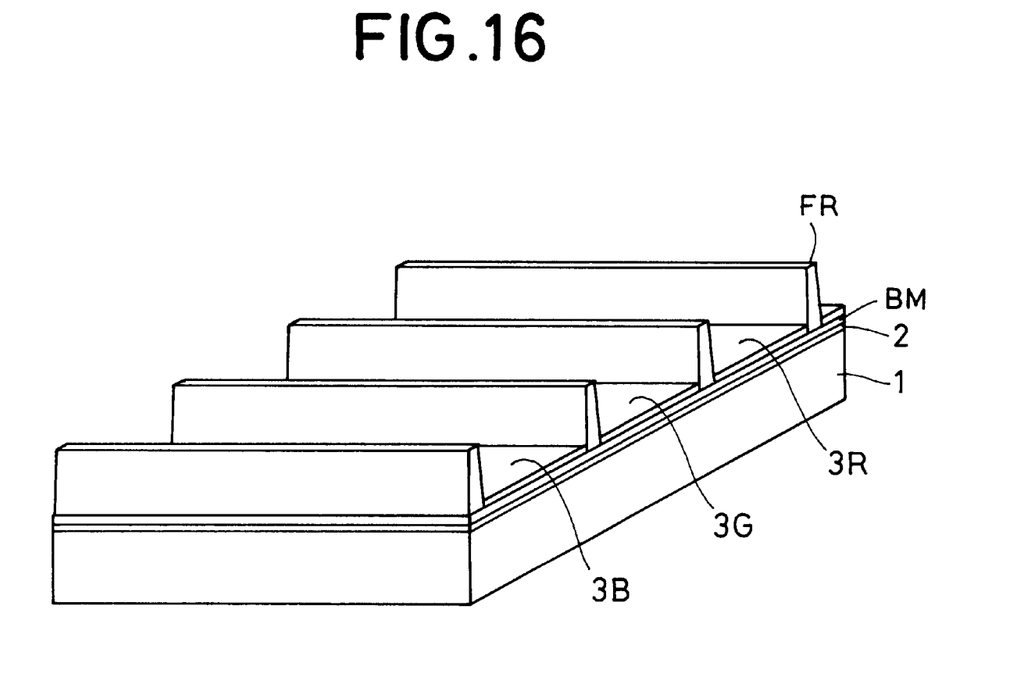

Finally, as illustrated in FIG. 16, fluorescent materials 3R, 3G, 3B are alternately applied between the respective front ribs FRs. As the fluorescent materials, for example, those used for CRT may be applied in a thickness of approximately 20 μm.

<Alignment Step>

The back substrate and the front substrate, fabricated as described above, are aligned such that the ribs RR on the back substrate 10 abut to the front ramparts RFs on the front substrate 1 and both the substrates oppose to each other with the vacuum space 4 interposed therebetween, and encapsulated around the periphery of the substrates. After evacuating the space between the two substrates, getter provided inside is scattered by inductive heating, and finally, an exhaust port is sealed. This is because impurity gas produced after the encapsulation is adsorbed.

The ohmic electrodes and the bus electrodes on the back substrate are connected to the ground and a positive voltage, respectively, while the transparent electrodes on the front substrate are connected to a positive voltage of several kV, thereby completing a flat panel display apparatus comprising a pair of optically transparent front substrate 1 and back substrate 10, as illustrated in FIG. 2.

What is claimed is:

1. An electron emission device based flat panel display apparatus comprising:

a back substrate and an optically transparent front substrate opposing each other with a vacuum space interposed therebetween;

a plurality of electron emission devices, each of said electron emission devices including an electron-supply layer made of metal or semiconductor formed on ohmic electrodes which are formed on a surface of said back substrate proximate to said vacuum space, an insulator layer formed on said electron-supply layer, and a thin-film metal electrode formed on said insulator layer and facing said vacuum space;

said front substrate including collector electrodes formed on its surface proximate to said vacuum space, fluorescent material layers formed on said collector electrodes, and an image display array comprised of a plurality of light emitting elements corresponding to said fluorescent material layers;

insulative support members formed on said back substrate and disposed between adjacent ones of said electron emission devices; and a plurality of electrodes, each of said electrodes disposed between adjacent ones of said thin-film metal electrodes and on said insulative support members for electrically connecting said thin-film metal electrodes.

2. An electron emission device based flat panel display apparatus according to claim 1, wherein the distance from said back substrate to the surfaces of said insulative support members proximate to said vacuum space is substantially equal to the distance from said back substrate to the surface of said thin-film metal electrodes proximate to said vacuum space.

3. An electron emission device based flat panel display apparatus according to claim 1, further comprising a plurality of bus electrodes, each of said bus electrodes arranged to electrically connect adjacent ones of said thin-film metal electrodes, said bus electrodes having a width between said thin-film metal electrodes larger than a width on said thin-film metal electrodes.

4. An electron emission device based flat panel display apparatus according to claim 1, wherein said back substrate includes a plurality of first insulative ribs, each of said first insulative ribs disposed between said electron emission devices, and having a height larger than the distance from said back substrate to the surface of said thin-film metal electrode proximate to said vacuum space, each of said first insulative ribs protruding into said vacuum space.

5. An electron emission device based flat panel display apparatus according to claim 4, wherein said first insulative ribs are formed on said insulative support members.

6. An electron emission device based flat panel display apparatus according to claim 5, wherein said front substrate includes a plurality of second insulative ribs, each of said second insulative ribs having a height larger than the distance from said front substrate to the surface of said fluorescent material layers proximate to said vacuum space, each of said second insulative ribs protruding into said vacuum space to abut to said first insulative ribs.

7. An electron emission device based flat panel display apparatus according to claim 6, wherein said second insulative ribs extend in a direction in which said ohmic electrodes extend, and abut to said plurality of first insulative ribs.

8. An electron emission device based flat panel display apparatus according to claim 4, wherein each of said first insulative ribs includes an overhung portion on the top thereof protruding in a direction substantially parallel with said back substrate.

9. An electron emission device based flat panel display apparatus according to claim 1, wherein said ohmic electrodes and said electrodes are stripe-like electrodes, and arranged to intersect orthogonal to each other.

* * * * *